US009191268B2

(12) United States Patent
Walden

(10) Patent No.: US 9,191,268 B2
(45) Date of Patent: Nov. 17, 2015

(54) EXTENSION FOR THE SIMPLE NETWORK MANAGEMENT PROTOCOL (SNMP) IN ORDER TO ASCERTAIN INFORMATION ON THE STATUS OF SET-PDUS

(75) Inventor: Andreas Walden, Pliezhausen (DE)

(73) Assignee: HIRSCHMANN AUTOMATION AND CONTROL GMBH, Neckartenzlingen (DE)

(*) Notice: Subject to any disclaimer, the term of this patent is extended or adjusted under 35 U.S.C. 154(b) by 360 days.

(21) Appl. No.: 13/811,263

(22) PCT Filed: Aug. 18, 2011

(86) PCT No.: PCT/EP2011/064233
§ 371 (c)(1),
(2), (4) Date: Feb. 12, 2013

(87) PCT Pub. No.: WO2012/022786
PCT Pub. Date: Feb. 23, 2012

(65) Prior Publication Data
US 2013/0227065 A1 Aug. 29, 2013

(30) Foreign Application Priority Data
Aug. 20, 2010 (DE) .......... 10 2010 035 040

(51) Int. Cl.
H04L 12/24 (2006.01)
(52) U.S. Cl.
CPC ............ H04L 41/00 (2013.01); H04L 41/0226 (2013.01); H04L 41/06 (2013.01); H04L 41/0213 (2013.01); H04L 41/046 (2013.01)

(58) Field of Classification Search
CPC . H04L 41/00; H04L 41/0213; H04L 41/0226; H04L 41/046; H04L 41/06
See application file for complete search history.

(56) References Cited

U.S. PATENT DOCUMENTS

| 6,275,853 B1* | 8/2001 | Beser et al. .................. 709/223 |
| 7,120,833 B2 | 10/2006 | Kinderman |
| 2004/0006619 A1 | 1/2004 | Syed |
| 2004/0163016 A1 | 8/2004 | Kim |
| 2006/0274678 A1* | 12/2006 | Holloway et al. ............. 370/260 |
| 2007/0276935 A1 | 11/2007 | Liu |
| 2009/0104697 A1 | 4/2009 | Cibelli |
| 2009/0204697 A1* | 8/2009 | Jaladanki et al. ............. 709/223 |

* cited by examiner

Primary Examiner — Brian J Gillis
Assistant Examiner — Gil H. Lee
(74) Attorney, Agent, or Firm — Foley & Lardner LLP

(57) ABSTRACT

The invention relates to a method for operating a network management station that exchanges data with the network devices connected to said station via bus connections by means of the SNMP protocol. An agent is integrated in each network device, said agent detecting the state of the network device and also being able to carry out adjustments or trigger actions in said device, wherein said agent communicates with the network management station via SET and GET commands. Furthermore, an error detection and/or an error notification between the network management station and the respective agents is carried out via the SNMP protocol. The method is characterized in that a further data exchange between the network management station and the respective agents is carried in addition to the data exchange provided according to the SNMP protocol in order to exchange further data content between the network management station and the respective agents using said further data exchange.

15 Claims, 2 Drawing Sheets

Figure 1:
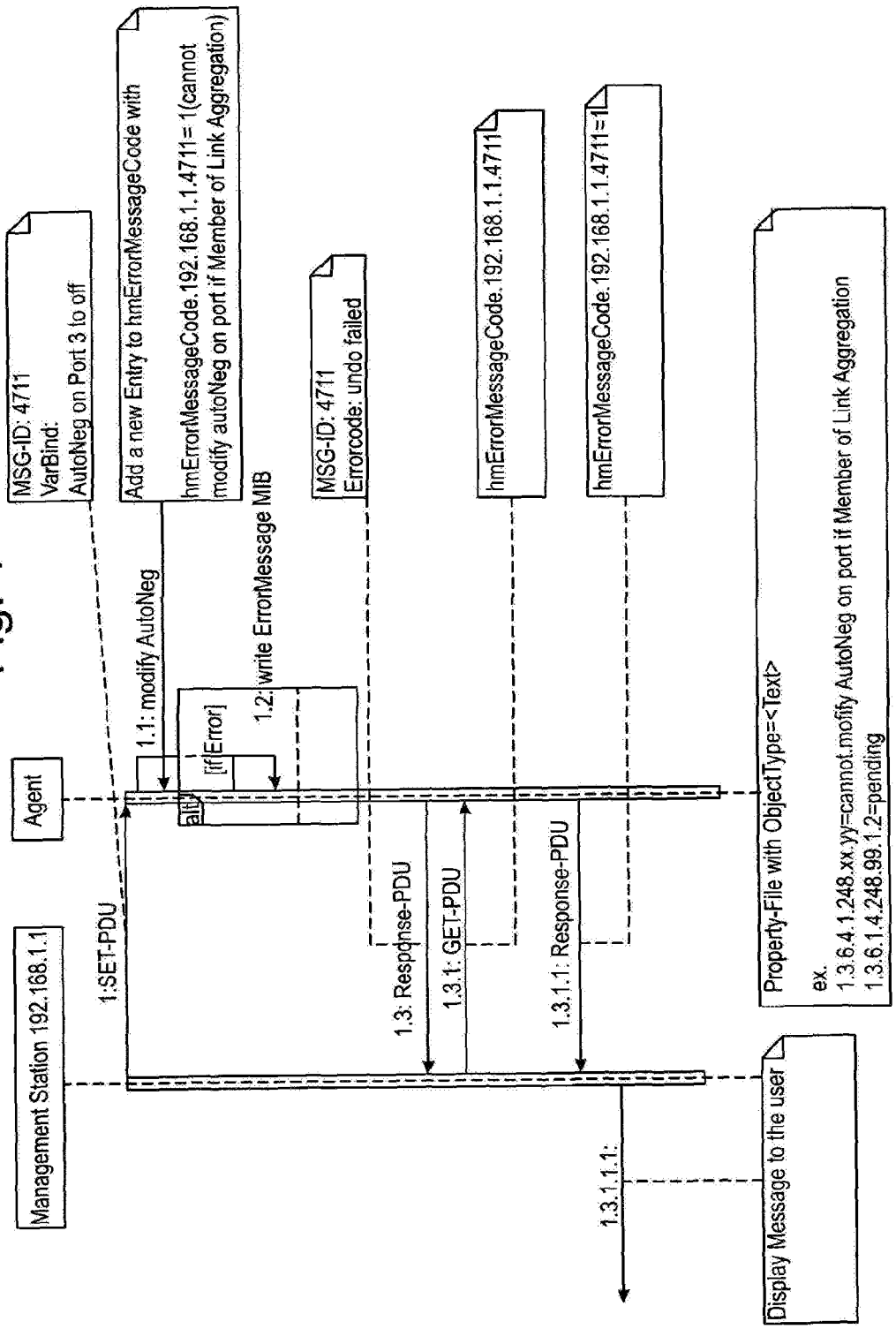

EXTENSION FOR THE SIMPLE NETWORK MANAGEMENT PROTOCOL (SNMP) IN ORDER TO ASCERTAIN INFORMATION ON THE STATUS OF SET-PDUS

CROSS REFERENCE TO RELATED APPLICATIONS

This application is the US-national stage of PCT application PCT/EP2011/064233 filed 18 Aug. 2011 and claiming the priority of German patent application 102010035040.0 itself filed 20 Aug. 2010.

The invention relates to a method of operating a network management station (also called Management Information Base, in short: MIB) that exchanges data with network devices connected to the station via bus connections by the SNMP protocol, where an agent is integrated in each network device, detects the state of the network device, and is to effect adjustments or triggering actions in the device by communicating with the network management station via SET and GET commands, where furthermore an error detection and/or an error notification between the network management station and the respective agent is carried out via the SNMP protocol, according to the features of the preamble of the patent claim 1.

The invention is based on the Simple Network Management Protocol (in short: SNMP) that concerns a network protocol able to monitor or control network elements (also called network devices, network infrastructure devices or the like such as, for example, routers, servers, switches, printers, computers etc.) from a central station (the MIB). The protocol controls the communication between the monitored devices and the network management station. SNMP describes the structure of the data packets that can be transmitted, and the communication process. The protocol has been designed such that each network-compatible device that is used in a network can be included in the monitoring. The tasks of the network management that are possible with the SNMP protocol include monitoring of network infrastructure devices, remote control and remote configuration of network infrastructure devices, and error detection and error notification in the event that an error has been detected in the network device.

Due to its simplicity, modularity and versatility, this protocol has become a standard in particular in automation technology and also already in office environments, which standard is supported by most of the (manufacturer-specific) management programs and also by terminal devices. Thus, it is to be considered as an advantage of SNMP that it is not dependent on the network protocol IP as a transport medium.

According to the requirements of the standardized SNMP protocol, so-called agents are used for monitoring the network devices. This involves programs that run directly on the monitored is network devices. These programs are capable of detecting the state of the network device and also of making adjustments or triggering actions. The SNMP makes it possible for the central network management station to communicate with the agent via a network (bus connection). For this, there are different data packets (such as, for example, GET and SET) that can be transmitted between the network management station and the agent and vice versa. These data packets are standardized according to SNMP and are known. In addition to these commands that can be exchanged, the command TRAP has also to be mentioned, which is an unrequested message from an agent to the network management station that an event has occurred. Thus, with this command, a data packet is transmitted automatically from the agent to the network management station without a request from the network management station. Usually, a TRAP is transmitted in order to report a malfunction of the network device (for example a defective module of a network device). Moreover, this data packet can also be sent if the dataset changes described in a SET data packet could not be carried out.

A significant disadvantage of the SNMP protocol is, in particular in versions 1 and 3, that the error codes that are transmitted on request or automatically from an agent to the network management station are not extendable. This means that due to standardization, certain predefined error codes are specified that are mandatory when using the SNMP protocol. An extension of these error codes with regard to the number and also the content thereof is not provided according to this standard.

In order to eliminate this significant disadvantage in practice, it has already been considered to no longer use the SNMP protocol for data exchange but to use other standards. They work also with regard to their functionality; however, they have the significant disadvantage that these standards do not involve widely established and manufacturer-recommended transmission media so that they are not used commercially for good reasons and are only used in niche applications. Thus, the focus of the present invention is to provide an extension for the SNMP protocol by means of which the disadvantages are eliminated. In addition, another disadvantage is that the SET requests sent by the network management station cannot be processed by the agent within the predefined time, the time for processing being predefined by the network management station. The goal here is to carry out the request within a time as short as possible in order not to unnecessarily delay data exchange. However, there is often not enough time available for the agent to complete its internal process for responding to the request. This results in overrunning during the request so that the inquired agent is forced to send an error message to the network management station.

In order to eliminate the above-described disadvantages, various solutions have already been provided in the prior art.

U.S. Pat. No. 7,120,833 provides an extension of the error data packet of the PDU (Protocol Data Unit) to 32 bit so as to be able to transmit specific error codes that are not provided and also not usable in this form in the SNMP protocol. This involves usually manufacturer-specific error codes, so the method described in U.S. Pat. No. 7,120,833 is actually very simple. However, the disadvantage is that the network management station has to be set up for processing these extended data contents that comprise error codes exceeding the SNMP protocol. However, this has the disadvantage that manufacturer specific configured network management stations and the associated network devices (for example of the manufacturer X) are not compatible with corresponding network management stations and associated network devices of the manufacturer Y. This is a disadvantageous and significant impediment to the use of such devices. Even if these different network management stations or network devices of different manufacturers were compatible with each other, it is not possible due to the standardized data (extension of the data packets for the error codes) to use these devices together with devices of other manufacturers which comply with the SNMP protocol.

In US 2004/0163016, error codes are described which are transmitted by means of a TRAP command. However, this has the disadvantage that the web interface of the device and the associated network management station must have open access in order to be able to transmit such TRAP commands. Moreover, it is not guaranteed that the TRAP command sent by an agent of a network device reaches the network management station. Thus, there can be errors in the respective network device and these errors can be transmitted, but they can get lost on the way to the network management station so that the latter cannot confirm the receipt.

A similar solution with the corresponding disadvantages as described in connection with U.S. Pat. No. 7,120,833 is known from US 2009/0204697.

In consideration of the above-described disadvantages, the invention shall provide an extension of the SNMP protocol by means of which on the basis of the standardized and widely used SNMP protocols such error codes are also transmitted that are not provided according to this standard. It shall particularly be emphasized here that the transmission is carried out in a secure and reliable manner.

This object is achieved by the features of the patent claim 1.

Based on the data exchange according to the standard of the SNMP protocol between the at least one network management station and the at least one network device, preferably a plurality of network devices, connected thereto, according to the invention a further data exchange is carried out between the network management station and the respective agent of a network device in addition to the data exchange provided according to the SNMP protocol in order to exchange through this further data exchange further data contents between the network management station and the respective agent.

Advantageously, the standardized data exchange between the at least one network management station and the at least one connected network device while using the standardized SNMP protocol is extended to that effect that a further data exchange takes place according to this standard. However, the data contents provided according to the standard are not transported but instead further data contents are exchanged between the agent of a network device and the network management station (and vice versa), these data contents being extended with respect to the data contents provided according to the SNMP protocol. This advantageously enables one to maintain the compatibility of network management stations and network devices that all support the SNMP standard. Above all, this has the advantage that network management stations and network devices of different manufacturers remain compatible with each other. At the same time, it becomes possible to exchange additional data contents between them in particular manufacturer specific configured devices and network management stations, which data contents can be requested by the network management station from the agent or can be delivered to the network management station by the agent without request. In this manner, the functionality of the standard SNMP for the purpose of data exchange between devices of different manufacturers (and also, of course, of the same manufacturers) is advantageously not only maintained but also significantly extended. In addition, one avoids that SET requests are not processed by the agent within the time predefined by the network management station and that a timeout occurs during the operation because within the elapsed time the agent can respond to the request of the network management station within the terms of the network management station such that an operation still has to be carried out so that the network management station initially receives a response within the predefined time. The data content of the response is such that according to the standardized specifications, no fault has occurred. Only in the next request of the network management station that is requested by the response or is through an unrequested submission of a response by the agent to the network management station, is the data content submitted to the network management station with that response of the agent that previously could not have been processed. Here, due to the additional data exchange (request and response or only unrequested response), data exchange is not according to the standard, but can comprise further data contents, in particular manufacturer-specific data contents.

In a refinement of the invention, the additional data exchange contains as data content at least one error code. This means that with this additional data exchange not only data contents with regard to the monitoring of the network devices and the remote control or remote configuration of network devices can be transmitted by the network management station, but that these data contents can also contain error codes for error detection and/or error notification, it being important that these additional error codes are not provided according to SNMP standard. This way, the SNMP standard can advantageously be extended by information about the error through the addition of any error codes, in particular manufacturer-specific error codes.

Furthermore, in one configuration of the invention the additional data exchange is carried out via OID (object identifier) according to the SNMP protocol. This makes it possible to use the standardized SNMP protocol for the "normal" and the "additional" data exchange and, at the same time, to extend the SNMP protocol.

In a refinement of the invention, the further data contents are provided by the agent in dependence on the error detection previously performed by the agent. This means that the further data contents are advantageously stored in a manufacturer-specific manner in the agent and can be submitted on request or unrequested to the network management station. In a refinement of the invention the agent determines the additional data content from a stored table and transmits it automatically (by means of a TRAP command) or on request by the network management station (by means of GET) to the latter. Since the standard SNMP itself does not define which values a network device can or has to deliver (since this depends on the type of the respective network device), the values that can be read out and changed by the network management station via the connected (managed) network component (network device) are described in a table, the so-called Management Information Base (in short: MIB). The values that can be read out and changed by the network management station via the managed network device are the so-called "managed objects". These are description files in which the individual values are listed in a table. The MIB is in each case specific for a certain network device or a group of network devices such as, for example, switches. The information of the MIB is organized in the form of a tree structure, the individual branches of which can be represented by numbers or alternatively by alphanumeric characters. These character strings consisting of dots and numbers are the object identifiers (in short: OID). In individual Management Information Bases there are further branches up to the individual data which have in each case their own OID and thus can be clearly identified. This means that advantageously, by using the above-described standard of the SNMP protocol, data can be exchanged between devices by using the standard that has now been extended according to the invention.

The invention is illustrated hereinafter with reference to the FIGS. 1 and 2.

Figure 2:
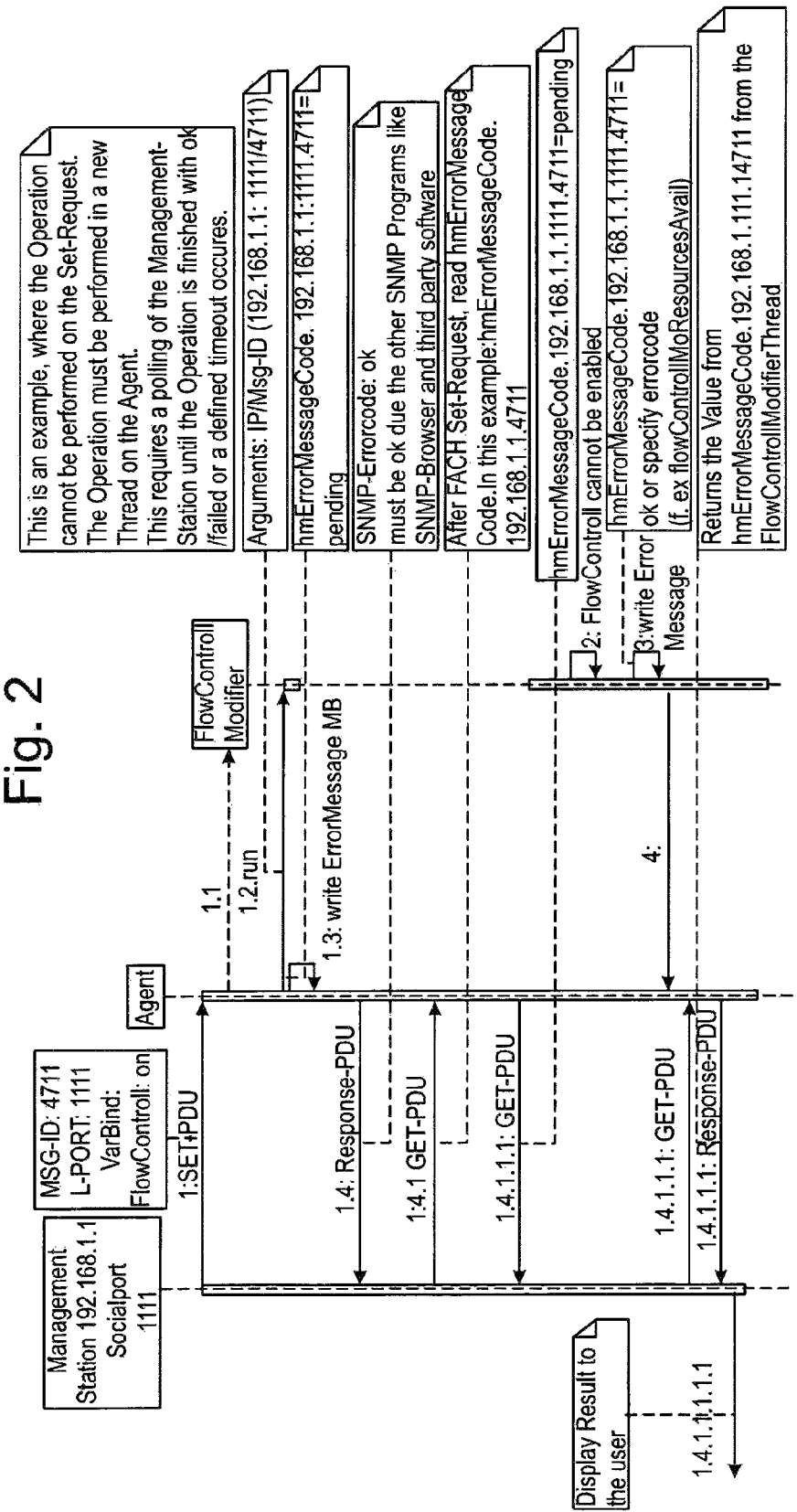

The MIB (Management Information Base) in FIGS. 1 and 2 describes an additional method according to the invention for the initial situations that are presented above in the prior art.

FIG. 1 relates to a sequence diagram for synchronous handling between the network management station and the at least one agent.

FIG. 2 relates to a sequence diagram for asynchronous handling between the network management station and the at least one agent.

After each SET request—independent of the result—a GET request for the MIB attribute "hmSNMPExtCode" is carried out. The instance is calculated from the local IP address, the local port number and the message identifier that contains the SET request.

If the agent supports the extension MIB, the following can happen:
1. The request was ok, thus, the value is the OID of the object identity "hmSNMPExtCodeNoError".
2. The request was not ok. This results in:
   a. The OID of the object identity "hmSNMPExtCode-GenericError", if no additional information from the agent is available.
   b. The OID of a specific object identity which is declared in a manufacturer-specific MIB.
3. The request needs more time for processing. This results in the OID of the object identity "hmSNMPExtCode-Pending". After the request has been processed by the agent, the return value depends on the result.

If the inquirer or the agent does not support this extension MIB, the result values have to be same as the ones with support of the MIB. Only if the inquirer and the agent support this extension MIB, extended error information can be output.

It is recommended that the sysOrTable be supported by the agent. This avoids additional requests to agents that do not support the HM-SNMP protocol extension MIB.

It is important for the invention that the method according to the invention is used on the basis of the SNMP standard and not for NAT applications since in the case of these NAT applications, no spin block is present which is absolutely necessary for carrying out the SNMP method.

This means that the present invention requires the SNMP standard, whereas it is not used for NAT applications (NAT: network address translation, a method that is used in routers which connect local networks to the internet).

Below, an exemplary program sequence is shown for clarification of the method according to the invention

```
MIB:
HIRSCHMANN-SNMP-PROTOCOL-EXT-MIB DEFINITIONS ::= BEGIN
IMPORTS
            MODULE-IDENTITY, OBJECT-TYPE, NOTIFICATION-TYPE, OBJECT-
IDENTITY, enterprises, Integer32, Unsigned32                         FROM SNMPv2-SMI
DisplayString, AutonomousType
        FROM SNMPV2-TC
                        TransportAddressIPv4, transportDomainUdpIpv4
            FROM TRANSPORRT-ADDRESS_MIB
                        hmConfiguration
                                                FROM HMPRIV-MGMT-SNMP-MIB;
hirschmann              OBJECT IDENTIFIER :: { enterprises 248 }
hmSNMPProtocolExt MODULE-IDENTITY
        LAST-UPDATED "200806031200Z" -- 03 Jun 2008 12:00:00 GMT
        ORGANIZATION "Hirschmann Automation and Control GmbH"
        CONTACT-INFO
                    "Andreas Walden
                    Postal:
                    Hirschmann Automation and Control GmbH
                    Stuttgarter Str. 45-51
                    72654 Neckartenzlingen
                    Germany
                    Tel: +49 7127 14 1981
                    Web: http://www.hicomcenter.com/
                    E-Mail: Andreas.Walden@belden.com"
        DESCRIPTION
                    "The Hirschmann SNMP Protocol Extension MIB."
        -- Revision history.
        DESCRIPTION
                "First release"
        ::= { hirschmann 99}
Key ::= TEXTUAL-CONVENTION
        STATUS                  current
        DESCRIPTION
                ""
        SYNTAX                  OCTET STRING (SIZE (1..255))
TKeyIPv4MsgId ::= TEXTUAL-CONVENTION
        DISPLAY-HINT "1d.1d.1d.1d:2d:4d"
        STATUS                  current
        DESCRIPTION
                    "Represents a transport address consisting of an IPv4 address and a port
        number and Message-ID.:
                    octets          contents        encoding
                    1-4             IPv4 address    network-byte order
                    5-6             port number     network-byte order
                    7-10            msg-id          network-byte order
                    This textual convention SHOULD NOT be used directly in object definitions
        since it restricts addresses to a specific format."
                SYNTAX          OCTET STRING (SIZE (10))
TKeyIPv6MsgId ::= TEXTUAL-CONVENTION
                DISPLAY-HINT "1d.1d.1d.1d:2d/2d"
                STATUS          current
                DESCRIPTION
                    "Represents a transport address consisting of an IPv4 address and a port number
``` and Message-ID.:

| octets | contents | encoding |
|---|---|---|
| 1-16 | IPv6 address | network-byte order |
| 17-18 | port number | network-byte order |
| 19-22 | msg-id | network-byte order |

This textual convention SHOULD NOT be used directly in object definitions since it restricts addresses to a specific format."
    SYNTAX    OCTET STRING (SIZE (22))
KeyType ::= TEXTUAL-CONVENTION
    STATUS    current
    DESCRIPTION
    "Denotes a kind of unique Identification of a SNMP-SET-PDU. Possible values are hmSNMPExtMsgKeyIPv4MsgId, hmSNMPExtMsgKeyIPvSMsgId. transportDomainUdpIpv4 and transportDomainUdpIpv6 from TRANSPORT-ADDRESS-MIB are also possible."
    SYNTAX    AutonomousType
hmSNMPExtMsgKey
    OBJECT IDENTIFIER ::= { hmSNMPProtocolExt 1 }
hmSNMPExtMsgKeyIPv4MsgId OBJECT-IDENTITY
    STATUS    current
    DESCRIPTION
    "ToDo: The UDP over IPv4 transport domain. The corresponding transport address is of type TKeyIPv4MsgId for global IPv4 addresses."
    ::= { hmSNMPExtMsgKey 1 }
hmSNMPExtMsgKeyIPv6MsgId OBJECT-IDENTITY
    STATUS    current
    DESCRIPTION
    "ToDo: The UDP over IPv6 transport domain. The corresponding transport address is of type TKeyIPv4MsgId for global IPv6 addresses."
    ::= { hmSNMPExtMsgKey 2 }
hmSNMPExtCodes
    OBJECT IDENTIFIER ::= { hmSNMPProtocolExt 2 }
hmSNMPExtCodeNoError OBJECT-IDENTITY
    ::= { hmSNMPExtEntry 2 }
hmSNMPExtCode OBJECT-TYPE
    SYNTAX    AutonomousType
    MAX-ACCESS    read-only
    STATUS    current
    DESCRIPTION    ""
    ::= { hmSNMPExtEntry 4 }
HmSNMPExtParameterEntry ::=
    SEQUENCE {
        hmSNMPExtParameterID
            Integer32,
        hmSNMPExtParameterValue
            DisplayString
    }
hmSNMPExtParameterTable OBJECT-TYPE
    SYNTAX    SEQUENCE OF HmSNMPExtParameterEntry
    ACCESS    not-accessible
    STATUS    mandatory
    DESCRIPTION ""
    ::= { hmSNMPProtocolExt 4 }
hmSNMPExtParameterEntry OBJECT-TYPE
    SYNTAX    HmSNMPExtParameterEntry
    ACCESS    not-accessible
    STATUS    mandatory
    DESCRIPTION    ""
    INDEX {
        hmSNMPExtKeyType,
        hmSNMPExtKey,
        hmSNMPExtParameterID
    }
    ::= { hmSNMPExtParameterTable 1 }
hmSNMPExtParameterID OBJECT-TYPE
    SYNTAX    Integer32
    MAX-ACCESS    not-accessible
    STATUS    current
    DESCRIPTION    ""
    ::= { hmSNMPExtParameterEntry 1 }
hmSNMPExtParameterValue OBJECT-TYPE
    SYNTAX    DisplayString
    MAX-ACCESS    read-only
    STATUS    current
    DESCRIPTION    ""
    ::= { hmSNMPExtParameterEntry 2 }
END

The invention claimed is:

1. A method of operating a network management station that exchanges data with network devices connected to the station via bus connections by the SNMP protocol, the method comprising the steps of:
   detecting with an agent in each network device the state of the network device and making adjustments or triggering actions in the device by communicating with the network management station via SET and GET commands;
   conducting an error detection or an error notification between the network management station and the respective agent via the SNMP protocol, wherein conducting the error detection or error notification comprises receiving, by the network management station from a first agent of a first network device, a first SNMP response, generated in response to a first SET request; and
   carrying out a further data exchange between the network management station and the first agent of the first network device in addition to the data exchange provided according to the SNMP protocol in order to exchange through this further data exchange further data contents between the network management station and the first agent, the further data exchange comprising:
      transmitting, by the network management station to the first agent, a GET request identifying the first SET request, responsive to receipt of the first SNMP response, and
      receiving, by the network management station from the first agent, a second SNMP response, generated in response to the GET request, indicating the first SET request resulted in either success or an error.

2. The method of operating a network management station according to claim 1, wherein the additional data exchange contains an error code as data content.

3. The method of operating a network management station according to claim 1, wherein the additional data exchange is carried out via OID according to the SNMP protocol.

4. The method of operating a network management station according to claim 1, wherein the further data contents are provided by the agent in dependence on the error detection previously performed by the agent.

5. The method of operating a network management station according to claim 4, further comprising the steps of:
   determining with the agent the additional data content from a stored table; and
   transmitting the determined additional data content to the network management station.

6. The method of operating a network management station according to claim 4, further comprising the steps of:
   determining with the agent the additional data content from a stored table; and
   transmitting the additional determined data content on request by the network management station to the network management station.

7. The method of claim 1, wherein transmitting the GET request is performed agnostic to the presence or absence of an error code in the first SNMP response.

8. The method of claim 7, wherein the first SNMP response does not include an error code; and wherein receiving the second SNMP response comprises receiving an SNMP response indicating the first SET request resulted in success.

9. The method of claim 8, wherein transmitting the GET request comprises transmitting a request for an extended attribute corresponding to the first SET request; and wherein receiving the second SNMP response comprises receiving a predetermined value for the extended attribute corresponding to successful processing of a request.

10. The method of claim 7, wherein the first SNMP response comprises a standard SNMP error code; and
   wherein receiving the second SNMP response comprises receiving an SNMP response indicating no manufacturer-specific error information is available; and further comprising
   presenting, to an administrator by the network management station, an identification of the standard SNMP error code and the first SET request.

11. The method of claim 10, wherein transmitting the GET request comprises transmitting a request for an extended attribute corresponding to the first SET request; and wherein receiving the second SNMP response comprises receiving a predetermined value for the extended attribute corresponding to an identification that no manufacturer-specific error information is available.

12. The method of claim 7, wherein the first SNMP response comprises a standard error code; and
   wherein receiving the second SNMP response comprises receiving an SNMP response identifying a manufacturer-specific error code; and further comprising
   presenting, to an administrator by the network management station, an identification of the manufacturer-specific error code and the first SET request.

13. The method of claim 12, wherein transmitting the GET request comprises transmitting a request for an extended attribute corresponding to the first SET request; and wherein receiving the second SNMP response comprises receiving a predetermined value for the extended attribute corresponding to the manufacturer-specific error code.

14. The method of claim 13, wherein the predetermined value is an object identifier.

15. The method of claim 1, wherein receiving the second SNMP response further comprises receiving the second SNMP response comprising the identification, as a name-value pair, indicating the first SET request resulted in either success or an error.

* * * * *